United States Patent [19]

Ih

[11] Patent Number: 4,880,286

[45] Date of Patent: Nov. 14, 1989

[54] MAKING A HOLOGRAPHIC OPTICAL ELEMENT USING A COMPUTER-GENERATED-HOLOGRAM

[75] Inventor: Charles C. Ih, Newark, Del.

[73] Assignee: University of Delaware, Newark, Del.

[21] Appl. No.: 110,128

[22] Filed: Oct. 19, 1987

[51] Int. Cl.$^4$ .......................... G03H 1/08; G02B 1/20
[52] U.S. Cl. ..................................... 350/1.1; 350/3.66; 350/3.69
[58] Field of Search ..................... 350/3.66, 3.71, 3.69, 350/1.1

[56] References Cited

PUBLICATIONS

Dickson et al, "Holography in the IBM 3687 Supermarket Scanner" IBM J. Res. Develop., vol. 26, No. 2, Mar. 1982, pp. 228–234.

Primary Examiner—Bruce Y. Arnold
Attorney, Agent, or Firm—Connolly & Hutz

[57] ABSTRACT

A method of producing an IR hologram having a planar surface on which a fringe pattern is recorded, the fringe pattern being produced by interference with a visible wavelength on the surface of reconstruction from a computer generated hologram.

1 Claim, 1 Drawing Sheet

MAKING A HOLOGRAPHIC OPTICAL ELEMENT USING A COMPUTER-GENERATED-HOLOGRAM

The Government of the United States has rights in this invention pursuant to Grant #ECS-8209184 from the National Science Foundation.

This invention relates to high resolution recording materials and more particularly to infrared holograms.

The preparation of an infrared hologram of an object may be carried out by a complex operation, such as by an electron beam device. This procedure has shortcomings.

Another problem in obtaining of infrared holograms of an object is the unavailability of high resolution recording materaial which are sensitive to infrared wavelength range.

According to the present invention, a high quality and high resolution IR hologram is prepared in a photosensitive material by a method that overcomes difficulties in preparing an IR hologram mentioned above. The method involves making an IR hologram at a different wavelength normally invisible than the intended IR wavelength through using a CGH.

First, the final hologram for a wavelength is defined mathematically. Then a Computer generated hologrm CGH is defined mathematically for a visible wavelength for which high resolution recording material is available. Then a hologram is determined at the second visible wavelength by computer reconstruction of the required IR hologram at a different wavelength to produce a wavefront which is interfered mathematically with a reference beam to determine the CGH. The CGH can be physically implemented by using known techniques. Then it is physically reconstructed by a reconstruction beam conjugate to the reference beam for which it was computed to create the required distorted wavefront needed to make the required hologram by mixing the reconstruction wavefront with a reference beam conjugate to the forming beam 14 of FIG. 2 and at a second wavelength, $\lambda 2$. This hologram is used at the IR wavelength without aberration.

A hologram is simply a record of the interference pattern created by an object beam and a reference beam. For a simple object and reference beam, such as plane wave or a point light source, the interference pattern can be easily calculated. In making a hologram, we need an object wave and a reference from a common coherent light source, such as is produced by a laser. The interference pattern of the object and reference beam (wave) recorded on a photographic film (or other recording material) is the hologram. To make a holographic optical-element (HOE) the object and reference beam assume a special form which can be a divergent or convergent point light source, a collimated beam (a point source at infinite), or another special form. By controlling these beam parameters (divergence angle, beam positions, etc.) one can make HOE's with different characteristics for different applications.

The entire process of using computer and related equipment to produce the required interference pattern or the hologram is referred to as Computer-Generated Holograms (CGH).

The conventional method for making a hologram is by exposing a photographic film or other photosensitive plate with the acutal interference pattern of the object and reference beam. Therefore, to make a hologram, one first creates the actual object and reference beam and the interference pattern. There is also the photosensitive material to record the interference pattern. Since the reconstruction of a hologram is very sensitive to the wavelength, normally the hologram is used at the wavelength at which the hologram was made. Most recording materials are only sensitive to shorter wavelengths but not in the IR. It is difficult to find a recording material which has the required resolution to record the hologram for wavelengths greater than 0.7 micrometer.

The first step to make a CGH is to mathematically specify the wavefront of the object and the reference beam. Since the object and reference beam exist as mathematical expressions in a computer, it is an object to create a hologram whose object wave may not physically exist. A CGH is utilized to make an IR hologram at a different wavelength and the hologram so created can be used at the intended IR wavelength without any aberrations. The technique also allows one to make IR holograms of any arbitrary size and configuration without the limitations cited above. Since the final step in making the hologram is optical, there is a choice of recording materials and also one can make volume (3-D) holograms which often have high diffractiin efficiencies.

The general procedures for making a conventional CGH are the following. After the wavefront of the object and reference beam have been defined, the phase of the waves at the plane hologram are then calculated. This results in interference patterns which are then plotted using some graphic output device, such as a pen plotter or laser printer. Since the hologram so produced by the plotter or printer is much larger than the actual hologram, it is then photographically reduced to a proper size. Also a CGH of a conventional size is made in one step using an electron-beam lithography system. However, there are a number of short comings in the use of electron beam machines. The processes of the peesent invention combine the advantage of the CGH and optical holography. First, a small CGH with a spatial frequency and resolution is made consistent with the available equipment. Then the CGH is used to create the objective wave to make the final hologram. The CGH is designed to create a pre-distorted objective wave at the chosen recording wavelength. The pre-distortion is so designed that when the final hologram is used at the operating wavelength, the reconstructed wave is free from any aberrations (distortions).

BRIEF DESCRIPTION OF THE DRAWINGS

The following is the sequence of steps to make an IR hologram at a different wavelength. The CGH provides a solution. As shown in FIG. 1, there is proposed mathematically according to this invention a hologram 10 operable at wavelength $\lambda 1$. This involves a reconstruction beam 11 incident on the hologram, and a conjugate 12 of the object wavefront being formed. Further it is noted there are no satisfactory photosensitive materials for directly making the hologram at wavelength $\lambda 1$, specifically above 700 nm. Assuming that the hologram 10 has been made mathematically and that there is a photosensitive material for second wavelength $\lambda 2$ if a beam 14 of the reference wave, with wavelength $\lambda 2$, illuminated this hologram 10 as shown in FIG. 2, the reconstructed wavefront 15 would be distorted and will be completely different from the conjugate 12 of the object wave in FIG. 1. The reconstructed wave 15, under these condutions, can be calculated by a computer.

Figure 1:
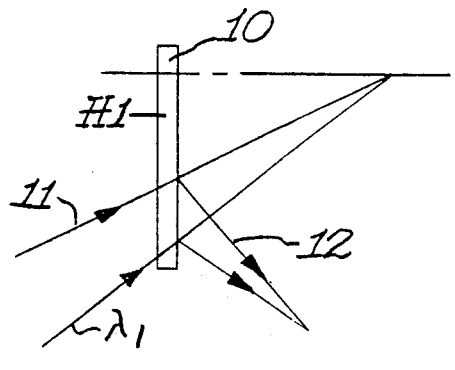
FIGS. 1, 2 and 3 are views of holograms and beams which illuminate the holograms and radiate therefrom.

The reconstruction beam is used by a computer to calculate the ray tracings as a function of the Welford equation.

$$\hat{\eta}_c \times (\hat{r}_d - \hat{r}_c) = m \frac{\lambda_c}{\lambda} [\hat{\eta}_r \times (\hat{r}_o - \hat{r}_r)] \quad (1)$$

in this equation: $\hat{r}_o$, $\hat{r}_r$ and $\hat{\eta}_r$ are the unit vectors for the object beam 10, the reference beam and the normal to the surface of the hologram in the recording process respectively; $\hat{r}_c$, $\hat{r}_d$ and $\hat{\eta}_c$ are the unit vectors of the reconstruction beam 14, the reconstructed beam 15, and the normal to the surface of the hologram in the reconstructing process respectively; $\lambda$ and $\lambda_c$ are the wavelengths in the recording and reconstruction process respectively; and m is the diffraction order, (m=0, ±1, ±2, ...).

The vector equation can be expanded into three scalar equations. These equations are linearly dependent on each other, and the rank of the equations is two. Thus another equation must be added for getting a unique solution. This additional equation is given by $$\hat{l}_d + \hat{m}_d + \hat{n}_d = 1.0$$

If $\hat{\eta}_c = \hat{\eta}_r = \hat{z}$, Equation (1) can be written as $$\hat{l}_d - \hat{l}_c = m \frac{\lambda_c}{\lambda} (\hat{l}_o - \hat{l}_r) \quad (3)$$

$$\hat{m}_d - \hat{m}_c = m \frac{\lambda_c}{\lambda} (\hat{m}_o - \hat{m}_r) \quad (4)$$

where $(\hat{l}, \hat{m}, \hat{n})$ form unit vector sets. From Equations (3, 4), $\hat{l}_d$ and $\hat{m}_d$ can be solved in the given conditions of the object beam 12, the reference beam 11, the reconstruction beam 14, and the wavelengths in the recording and reconstruction process. Then $\eta_d$, from Equation (2) is equal to $\eta_c$ in thsi case.

Figure 3:
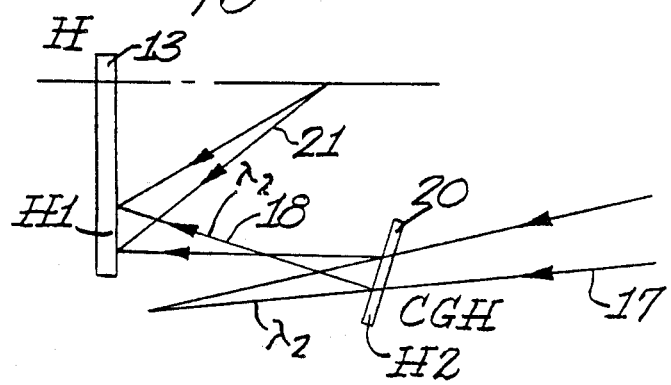

This synthetically reconstructed wavefront 15 will be recorded by another synthetic reference beam 16 with the wavelength $\lambda_2$. This "recording" is actually made by a computer, i.e., a CGH 20. As soon as this CGH 20 is made as shown in FIG. 3, a reconstruction beam 17, which is the reverse of the synthetic reference beam 16, illuminates the CGH 20 and a reverse wavefront of 18 is reconstructed at wavelength $\lambda_2$. The hologram in FIG. 1 can now be made by the interference between the reference beam 18 and the reconstructed wavefront 18 from the CGH 20 as the wavelength $\lambda_2$ as shown in FIG. 3. The geometrical position and orientations of the reference beam 11 is the same as in FIG. 1.

The hologram 10 is not essential to making CGH20 whch is used to recreate hologram 10 at $\lambda_2$. If hologram 10 can be defined mathematically, it is possible to make CGH20 by a computer. CGH20 is actually a CGH (Computer-Generated-Hologram) from which we can make the required hologram H1 at the wavelength $\lambda_2$. In summary the process is as follows:

Assume that the required hologram is known and can be defined exactly by a mathematical expression. The hologram 10 can be reconstructed with a well-defined reconstruction beam 14 at wavelength $\lambda_2$. The only requirement in choosing beam 14 is that it can be defined mathematically and that it can be produced physically and precisely. A possible choice is making the reconstruction beam identical to the final reconstruction beam 11 (FIG. 1), excepting that the wavelength is at $\lambda_2$. This choice is for illustration. Once the reconstruction beam is defined, the reconstruction can be done entirely within a computer. Because of the difference in wavelength, the reconstruction is distorted. The distorted wave is to make the CGH20 (at wavelength $\lambda_2$) with a proper choice of the reference beam 16. An additional requirement is that the spatial and total resolution of the CGH20, is compatible with the physical equipment which will be used to produce the CGH.

Once the second wavelength $\lambda_2$ is determined and the reconstruction beam defined, the computer construction of the CGH begins. There are many ways to construct the CGH. One method is to calculate and construct each fringe line one by one. Since the curvature of the fringe lines is quite small, it is sufficient to calculate only a limited number of points along a fringe line in order to produce the entire line. A simple computer algorithm can be used to connect these points to form a smooth line.

Figure 2:
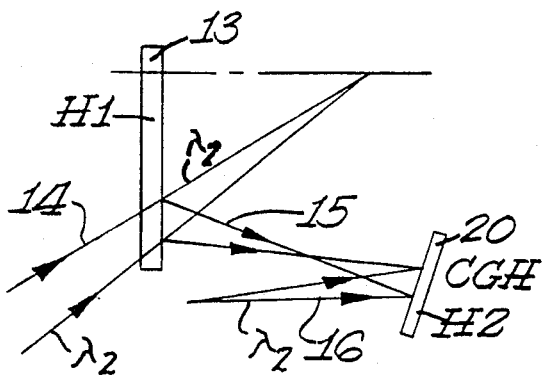

As shown in FIG. 2, for each ray of the reconstructed beam, the diffracted ray can be calculatd by a computer using Welford Equation. The (constructive) fringes of the CGH20 are the loci where the phases of the diffracted and reference wave are the same. By calculating all the successive fringes, the CGH20 is created in the computer. Since the CGH is generated from another hologram, the calculation is complicated by the fact that the phase of the diffracted ray from successive fringes on the primary hologram subjects additional phase change. this additional phase change must be treated correctly. Otherwise, the phase, i.e., the CGH would not be correct. The following method has been developed to determine the additional phase change.

1. Grating Spacing Method

Taking a planar grating which has a fringe spacing, d, if a plane wave is incident on the grating at an incident angle O, the diffracted wave will emerge at an angle, O', such as to satisfy the grating equation $$\sin \theta + \sin \theta' = md/\lambda$$

Where $\theta$ and $\theta'$ are the incident and diffracted angles, the wavelength, and m the diffraction order (normally in the first order, m=1 or −1).

Figure 4:
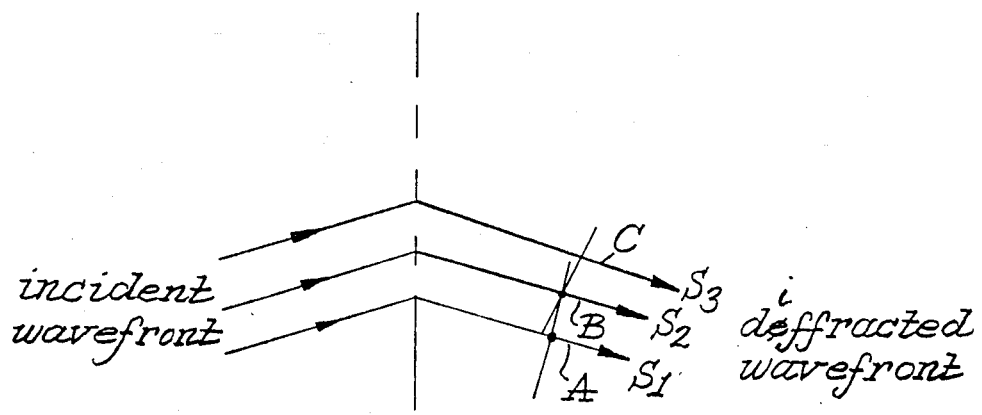
FIG. 4 is a schematic side view of a wavefront incident on a planar grating.

Therefore, the incident wavefront is transformed into a new wavefront (the diffracted wave) by the grating. It is known in theory of optics that the phases of the wave along the wavefront are all equal (to a constant). The phase difference (or the optical path difference—OPD) between rays passing through the centers of two adjacent grating lines, (see FIG. 4) is $2\pi$ (or OPD=one wavelength). The increment (or decrement) of OPD of both the incident ray and diffracted contribute to the $\pi 2$ phase diffence. The contributions to the phase difference from the rays can be easily calculated for the plane waves. If $\theta = \theta'$, the two rays contribute equally to the phase of $2\pi$, i.e., one $\pi$ for each ray. In calculating the CGH, one may need rays which may not pass exactly at the center of the grating lines and the phase should be scaled proportionally. This method can be extended and applied to general waves and to general holograms provide that the wavefront of the incident wave is known and can be calculated.

Although only certain preferred embodiments of the present invention have been described herein, it is not intended that the invention be restricted thereto, but that it be limited only by the spirit and scope of the appended claims.

I claim:

1. A method of producing a high resolution infrared hologram with the aid of a digital computer comprising defining mathematically a final infrared hologram by specifying mathematically a first object beam and a first reference beam at a fist wavelength, determining a computer generated hologram (CGH) by calculating a reconstructed wavefront from said mathematically defined IR hologram at a second wavelength by computer calculation using the Welford equation, interfering mathematically said reconstructed wavefront with a second reference beam to determine said CGH by computer calculations at said second wavelength, physically implementing the determined CGH, and then reconstructing by a reconstruction beam at the second wavelength and conjugate to the second reference beam, creating a distorted wavefront, and making the said final IR hologram by mixing said reconstruction wavefront with a beam conjugate to said first reference beam at said second wavelength.

* * * * *